United States Patent
Li

(10) Patent No.: US 10,949,479 B2
(45) Date of Patent: Mar. 16, 2021

(54) RETRIEVAL OF CONTENT USING LINK-BASED SEARCH

(71) Applicant: ModeSens Inc, Kirkland, WA (US)

(72) Inventor: Hang Li, Kirkland, WA (US)

(73) Assignee: ModeSens Inc., Kirkland, WA (US)

( * ) Notice: Subject to any disclaimer, the term of this patent is extended or adjusted under 35 U.S.C. 154(b) by 326 days.

(21) Appl. No.: 15/496,267

(22) Filed: Apr. 25, 2017

(65) Prior Publication Data

US 2017/0316100 A1 Nov. 2, 2017

Related U.S. Application Data

(60) Provisional application No. 62/329,825, filed on Apr. 29, 2016.

(51) Int. Cl.
*G06F 16/9535* (2019.01)
*G06F 16/2455* (2019.01)
*G06F 16/955* (2019.01)
*G06Q 50/18* (2012.01)

(52) U.S. Cl.
CPC ...... *G06F 16/9535* (2019.01); *G06F 16/2455* (2019.01); *G06F 16/9566* (2019.01); *G06Q 50/184* (2013.01)

(58) Field of Classification Search
CPC ............. G06F 16/9535; G06F 16/9566; G06F 16/2455
USPC ........................................................ 707/706
See application file for complete search history.

(56) References Cited

U.S. PATENT DOCUMENTS

| | | | | |
|---|---|---|---|---|
| 5,920,859 | A * | 7/1999 | Li .......................... | G06F 16/30 715/205 |
| 6,411,725 | B1 * | 6/2002 | Rhoads ................. | G10L 19/018 382/100 |
| 7,181,438 | B1 * | 2/2007 | Szabo ................. | G06F 21/6245 |
| 7,734,680 | B1 * | 6/2010 | Kurapati ................ | G06F 16/44 709/203 |
| 8,005,816 | B2 * | 8/2011 | Krishnaprasad ........ | G06F 16/20 707/709 |
| 8,042,112 | B1 * | 10/2011 | Zhu ....................... | G06F 16/951 718/102 |
| 8,707,451 | B2 * | 4/2014 | Ture .................... | G06F 21/6218 726/28 |
| 9,672,296 | B2 * | 6/2017 | Wu ....................... | G06F 16/958 |
| 10,147,399 | B1 * | 12/2018 | Mott ...................... | G09G 5/377 |
| 2002/0090114 | A1 * | 7/2002 | Rhoads ................. | G07C 9/253 382/100 |

(Continued)

*Primary Examiner* — Mark E Hershley
(74) *Attorney, Agent, or Firm* — Perkins Coie LLP

(57) ABSTRACT

Described herein are techniques and systems for retrieval of content using link-based searches. Embodiments herein include receiving, by a server, a request including a hyperlink directed to a source content. The server may determine whether a database associated with the server comprises the hyperlink. The database stores information of multiple entities each corresponding to one or more hyperlinks. In response to a determination that the database includes the hyperlink, the server may identify an entity corresponding to the hyperlink and provide information of the entity to the computing device. In some embodiments, in response to a determination that the database does not include the hyperlink, the server may identify related web content and return results to user.

20 Claims, 8 Drawing Sheets

(56) References Cited

U.S. PATENT DOCUMENTS

| | | | | |
|---|---|---|---|---|
| 2003/0078992 | A1* | 4/2003 | Kirkwood | G06F 16/9558 709/218 |
| 2004/0024653 | A1* | 2/2004 | Edgardo | G06F 16/9535 705/26.1 |
| 2004/0150715 | A1* | 8/2004 | Wilcock | G06Q 30/02 348/143 |
| 2005/0071310 | A1* | 3/2005 | Eiron | G06F 16/24566 |
| 2005/0149565 | A1* | 7/2005 | Oak | G06F 3/1272 |
| 2006/0155707 | A1* | 7/2006 | Marcjan | G06F 16/955 |
| 2007/0067297 | A1* | 3/2007 | Kublickis | G06Q 20/29 |
| 2007/0150457 | A1* | 6/2007 | Goldman | G06F 16/954 |
| 2007/0150721 | A1* | 6/2007 | Goldman | G06Q 30/0251 713/154 |
| 2007/0263984 | A1* | 11/2007 | Sterner | G11B 27/034 386/234 |
| 2008/0065406 | A1* | 3/2008 | Adelman | G06Q 30/02 705/319 |
| 2008/0071901 | A1* | 3/2008 | Adelman | H04L 67/306 709/223 |
| 2008/0168135 | A1* | 7/2008 | Redlich | G06F 21/6218 709/204 |
| 2008/0172391 | A1* | 7/2008 | Adelman | G06F 16/958 |
| 2009/0070297 | A1* | 3/2009 | Hadzima, Jr. | G06F 16/951 |
| 2009/0192871 | A1* | 7/2009 | Deacon | G06Q 50/01 705/319 |
| 2009/0198649 | A1* | 8/2009 | Vaughan | G06F 16/972 |
| 2009/0254572 | A1* | 10/2009 | Redlich | G06Q 10/06 |
| 2009/0262975 | A1* | 10/2009 | Rhoads | H04N 19/20 382/100 |
| 2010/0094891 | A1* | 4/2010 | Noyes | G06F 16/951 707/759 |
| 2010/0145927 | A1* | 6/2010 | Kasbekar | G06F 16/9535 707/710 |
| 2010/0205241 | A1* | 8/2010 | Lin | H04N 21/47805 709/203 |
| 2010/0223260 | A1* | 9/2010 | Wu | G06F 17/3089 707/723 |
| 2011/0137895 | A1* | 6/2011 | Petrou | G06F 16/24575 707/723 |
| 2011/0213655 | A1* | 9/2011 | Henkin | G06Q 30/0251 705/14.49 |
| 2011/0231268 | A1* | 9/2011 | Ungos | G06Q 20/3274 705/17 |
| 2011/0246443 | A1* | 10/2011 | Bhatkar | G06F 21/6218 707/709 |
| 2011/0276396 | A1* | 11/2011 | Rathod | H04L 51/066 705/14.49 |
| 2012/0128251 | A1* | 5/2012 | Petrou | G06K 9/00456 382/182 |
| 2012/0259882 | A1* | 10/2012 | Thakur | G06F 16/951 707/767 |
| 2012/0284081 | A1* | 11/2012 | Cheng | G06Q 30/02 705/7.29 |
| 2013/0031088 | A1* | 1/2013 | Srikrishna | G06F 16/248 707/722 |
| 2013/0144818 | A1* | 6/2013 | Jebara | G06Q 50/02 706/12 |
| 2013/0159298 | A1* | 6/2013 | Mason | G06F 16/9535 707/728 |
| 2013/0159826 | A1* | 6/2013 | Mason | G06F 16/951 715/205 |
| 2013/0173582 | A1* | 7/2013 | Liao | G06F 16/248 707/709 |
| 2013/0179762 | A1* | 7/2013 | Gray | G06F 40/134 715/205 |
| 2014/0258243 | A1* | 9/2014 | Bell | G06F 16/23 707/690 |
| 2014/0324946 | A1* | 10/2014 | Zhang | H04L 67/1095 709/203 |
| 2014/0324986 | A1* | 10/2014 | Zhang | H04L 51/046 709/206 |
| 2015/0127628 | A1* | 5/2015 | Rathod | G06F 16/955 707/710 |
| 2015/0186390 | A1* | 7/2015 | Katic | H04L 67/2842 709/203 |
| 2015/0239347 | A1* | 8/2015 | Oldewurtel | G06F 16/9558 707/722 |
| 2015/0286721 | A1* | 10/2015 | Voronov | G06F 16/24578 707/706 |
| 2016/0007083 | A1* | 1/2016 | Gurha | H04N 21/252 725/13 |
| 2016/0154856 | A1* | 6/2016 | Olof-Ors | G06F 16/24578 707/728 |
| 2016/0156716 | A1* | 6/2016 | Murakami | H04L 67/1097 709/217 |

* cited by examiner

RETRIEVAL OF CONTENT USING LINK-BASED SEARCH

CROSS REFERENCE TO RELATED PATENT APPLICATIONS

This application claims priority to U.S. Provisional Patent Application No. 62/329,825, filed on Apr. 29, 2016, entitled "System and Method for Retrieval of Aggregated Content Using Link-Based Search," which is hereby incorporated by reference in its entirety.

BACKGROUND

Conventional search engines (such as Google® and Microsoft Bing®) permit a user to conduct a search and identify web pages of interest by formulating a search query based on keywords and Boolean operators. While effective, this approach is not conducive to finding content related to that contained in a web page. For example, converting the content found on a web page into subsequent search queries can be time-consuming and inefficient for a user. Further, the utility of the search results is strongly dependent upon the skill of the user in terms of their ability to synthesize the information they find and reduce that information to an effective set of words or phrases. Combining this uncertainty with the iterative nature of most searches results in a process that can be time-consuming, frustrating, and less than optimal.

SUMMARY

Described herein are techniques and systems for retrieval of content using link-based searches. Embodiments herein include receiving, by a server, a request including a hyperlink directed to a source content from a computing device. The server may determine whether a database associated with the server comprises the hyperlink. The database stores information of multiple entities each corresponding to one or more hyperlinks. In response to a determination that the database includes the hyperlink, the server may identify an entity (e.g., content or web pages) corresponding to the hyperlink and provide information of the entity to the computing device. However, in response to a determination that the database does not include the hyperlink, the server may analyze, perform a search based on the one or more parameters (e.g., words or vectors), and provide a search result to the computing device.

For example, when a user is looking at an article on-line, the solution allows the user to find related content (e.g., other web pages containing content regarding the same item or event) with minimum user actions. The embodiments of the present disclosure allow the user to access contents of a web page from a link (e.g., a web page identifier) and find one or more pages containing related contents. The related contents may then be aggregated and presented to the user in a web page, multiple web pages, or as a document.

The approach significantly simplifies current methods by which users acquire information related to the content of interest. Using conventional approaches, a user would have to process and convert web page content into one or more keywords and search for incidences of those keywords using a search engine. Based on the results, the user may have to iteratively repeat the process using additional keywords or variations of the words chosen in order to narrow the search results into information of sufficient usefulness. This can be time-intensive and inefficient for many users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described concerning the accompanying figures. In the figures, the left-most digit(s) of a reference number identifies the figure in which the reference number first appears. The same reference numbers in different figures indicate similar or identical items.

DETAILED DESCRIPTION

Conventional search engines (such as Google and Microsoft Bing) permit a user to conduct a search and identify web pages of interest by formulating a search query based on keywords and Boolean operators. While effective, this approach is not conducive to finding content related to that contained in a web page because converting the content found on a web page into subsequent search queries can be time-consuming and inefficient for a user. Further, the utility of the search results is strongly dependent upon the skill of the user in terms of their ability to synthesize the information they find and reduce that information to an effective set of words or phrases.

Embodiments of the system and methods provide a user with an aggregation of content related to an item or subject of interest. Execution of the process is initialized or "triggered" when the user provides a link to a web page containing an example of the content of interest (e.g., a web page from a commerce web-site that describes an item of interest, a web page containing an article describing an event of interest, etc.). Thus, embodiments of the present disclosure permit a user to acquire content related to the content of interest by using a web page link instead of one or more search terms (such as keywords that are determined by a user).

Figure 1:
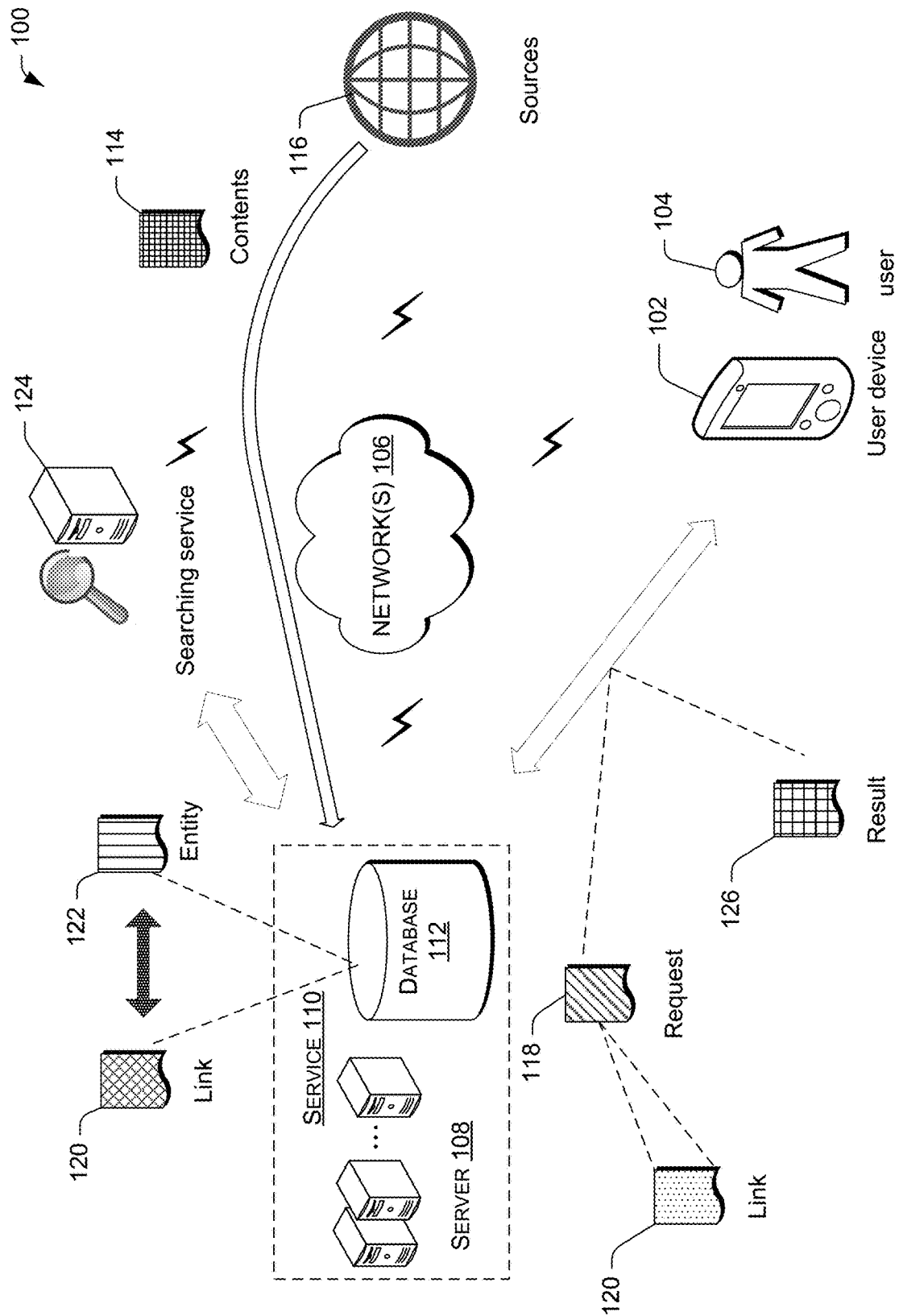
FIG. 1 is a diagram of an illustrative environment that enables retrieval of content using link-based searches.

FIG. 1 is a diagram of an illustrative environment 100 that enables retrieval of content using link-based searches. Environment 100 includes a user device 102 associated with a user 104. The articles "a" and "an" are used herein to refer to one or more than one (i.e. to at least one) of the grammatical object of the article. By way of example, "a user" means one user or more than one users. User 104 may include a user who uses a computing device (e.g., user device 102) to exchange information via a network 106 with other computing devices.

User device 102 may correspond to a wide variety of devices or components that are capable of initiating, receiving or facilitating communications over network 106. User device 102 may include one or more of personal computing devices, electronic book readers (e.g., e-book readers), handheld computing devices, integrated components for inclusion in computing devices, home electronics, appliances, vehicles, machinery, landline telephones, network-based telephones (e.g., voice over IP ("VoIP"), cordless telephones, cellular telephones, smartphones, modems, personal digital assistants, laptop computers, gaming devices, media devices, etc.

Network 106 may include wired and/or wireless networks that enable communications between the various computing devices described in environment 100. In some embodiments, network 106 may include local area networks (LANs), wide area networks (WAN), mobile telephone networks (MTNs), and other types of networks, possibly used in conjunction with one another, to facilitate communication between the various computing devices (e.g., user device 102 and a server 108).

Server 108 may be associated with a service 110. In some embodiments, service 110 refers to a set of related software functionalities that may be reused for different purposes, together with the policies that, for example, retrieving of content using link-based searches. In some instances, service 110 may establish a database 112 storing associations between hyperlinks and content information corresponding to the hyperlinks and/or enable user 104 to query database 112.

In some embodiments, service 110 may collect links (e.g., hyperlinks) and contents 114 corresponding to the links from sources 116. For example, sources 116 may include various web pages from online resources (e.g., item manufacturers, brandings, social media network).

In some embodiments, service 110 may extract entity information from contents 114 and determine one or more entity based on the entity information. For example, service 110 may identify a hyperlink and extract contents corresponding to the hyperlink. Further, service 110 may identify an entity and extract the representation as well as one or more features of the entity based on the contents. In some embodiments, service 110 may associate the entity with the hyperlink and store the association in database 112. For example, the service 110 may associate the hyperlink to a representation of the entity and then store the association between the hyperlink and the representation in database 112. In these instances, the entity may correspond to one or more hyperlinks.

In some embodiments, the entity information may include representations of entities and features of the entities. For instances, an example of the entity may include an item, a document (e.g., a patent and patent application), an article, a drug, a piece of news. Accordingly, the representation of an entity may be a unique ID of the entity such as a manufacturer ID of an item, a serial number of a patent document, and a Digital Object Identifier (DOI) number of an article. In some embodiments, a feature of an entity may include descriptions of the entity, a person associated with the entity, and/or a price of the entity. For example, suppose that the entity is an item (e.g., cloth), the feature of the item may include descriptions of the cloth, celebrities who wear the cloth, and a price of the cloth.

In some embodiments, service 110 may enable user 104 to query database 112, perform hyperlink-base searches, and provide search results to user device 102. For example, server 108 may receive a request 118 from user device 102, and request 118 may include a link 120 (e.g., a hyperlink). Server 108 may perform searches in database 112 to determine whether database 112 includes link 120. In response to a determination that the database 112 includes link 120, server 108 may determine an entity 122 corresponding to link 120 and extract features and representation of the entity 122. Further, server 108 may transmit a result 126 including, for example, the features and representation of the entity 122 to user device 102.

In some embodiments, server 108 may determine that database 112 does not include link 120, server 108 may retrieve content information corresponding to the web site directed by link 120 and analyze the content information to generate topic information, which includes one or more vectors and/or keywords. For example, server 108 may determine a keyword based on the content information and query a searching service 124 using the keyword. Further, server 108 may receive multiple results each including a hyperlink and select one or more hyperlinks. Server 108 may further search database 112 using the one or more hyperlinks to determine an entity corresponding to the one or more hyperlinks.

If server 108 determines that the database 112 includes the entity, the server 108 may provide features and a representation of the entity to user device 102. If server 108 does not identify any entity based on the one or more hyperlinks, server 108 may further generate topic vectors (e.g., multiple dimensional vectors). Server 108 may calculate distances between the topic vector and topic vectors corresponding to hyperlinks stored in database 112. Further, server 108 may select a hyperlink from the hyperlinks based on the distances and identify an entity corresponding to the hyperlink.

Figure 2:
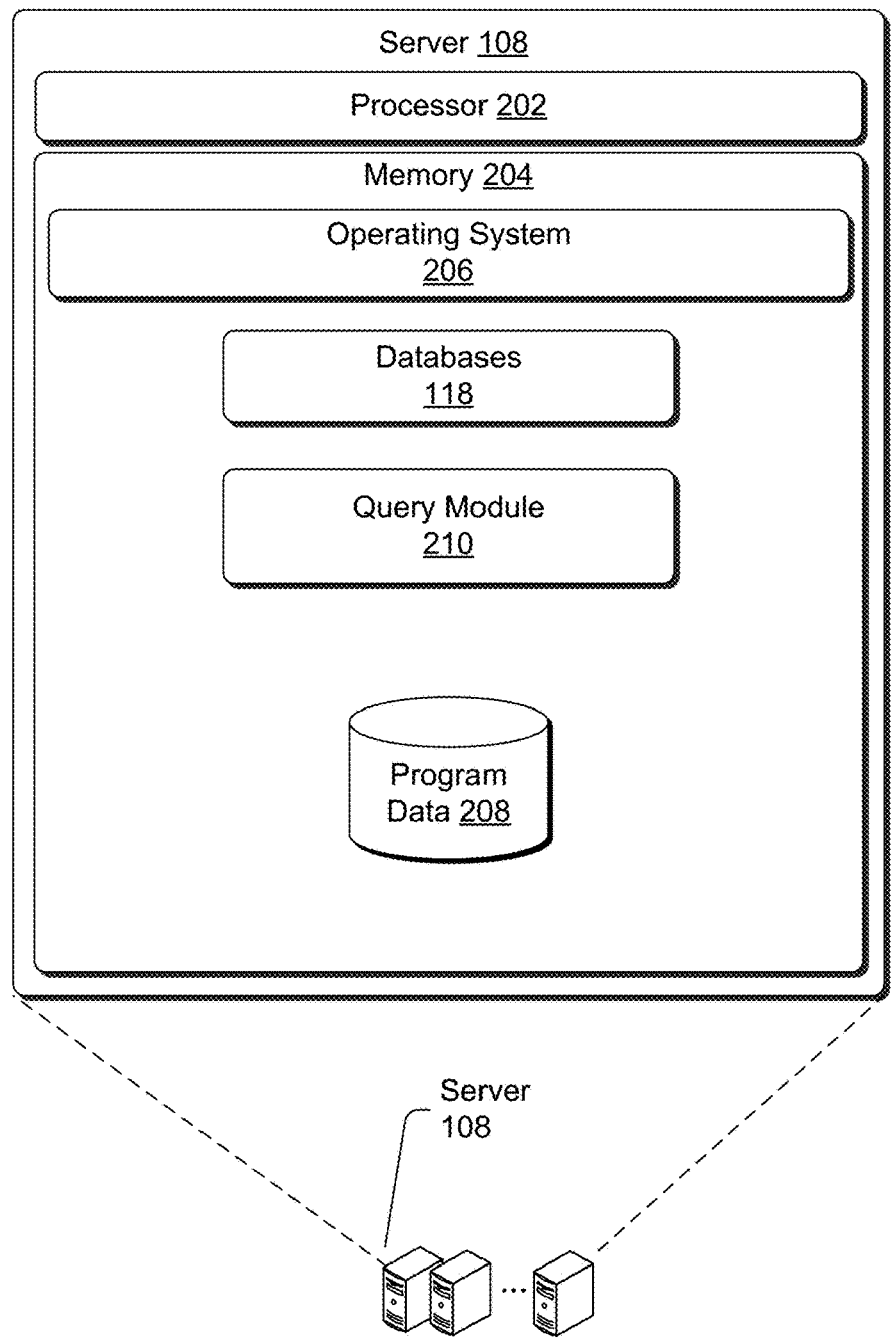
FIG. 2 is a schematic diagram of an illustrative computing architecture configured to enable retrieval of content using link-based searches.

FIG. 2 is a schematic diagram of an illustrative computing architecture 200 configured to enable retrieval of content using link-based searches. Computing architecture 200 shows additional details of at least one portion of service 110, which may include additional modules, kernels, data, and/or hardware.

Computing architecture 200 may include a processor 202 and memory 204. Memory 204 may store various modules, applications, programs, or other data. The memory 204 may include instructions that, when executed by processor 202, cause processor 202 to perform the operations described herein for the server 108. Processor 202 may include one or more graphics processing units (GPU) and one or more central processing units (CPU).

Server 108 may have additional features and/or functionality. For example, server 108 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer-readable instructions, data structures, program modules, program data, or other data. The system memory, the removable storage, and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by server 108. Any such computer storage media may be part of server 108. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or another mechanism. As defined herein, computer storage media does not include communication media.

Memory 204 may store an operating system 306 as well as program data 308, database 112, and a query application 210. Database 112 may be configured to store associations between link 120 and entity 122.

Query application 210 may receive a request including link 120 (e.g., a hyperlink) directed to a source content and determine whether database 112 includes link 120. For example, database 112 may store information of multiple entities each corresponding to one or more hyperlinks. For example, the entity is an item, and the representation is a unique ID of the item. Alternatively, the entity is a patent document, and the representation is a serial number associated with the patent documents. In some embodiments, query application 210 may further collect multiple hyperlinks and contents corresponding to the multiple hyperlinks. Query application 210 may extract the information from the contents, associate the information with the multiple entities, and store the information in database 112.

In response to a determination that database 112 includes link 120, query application 210 may identify entity 122 corresponding to link 120, extract information of entity 122, and provide the information to user device 102. For example, the information of multiple entities may include a representation of an individual entity, a feature of the individual entity, the one or more hyperlinks, and an association between the representation and the one or more hyperlinks. In some implementations, query application 210 may retrieve the representation and the feature of the entity and provide the representation and the feature to user device 102.

In response to a determination that database 112 does not includes link 120, query application 210 may analyze the source content to determine one or more parameters and perform a search based on the one or more parameters, for example using searching service 124. Query application 210 may further obtain a search result and provide the search result to the computing device. For example, server 108 may download and analyze the source content that the link returns to determine these parameters.

In some embodiments, the one more parameters are one or more keywords. Query application 210 may perform searches based on the one or more parameters using searching service 124. Query application 210 may further identify a predetermined number of returning results, retrieve hyperlinks corresponding to the returning results, and search database 122 to identify one or more entities corresponding at least one of the hyperlinks. Further, query application 210 may generate the search result based on the one or more entities.

In some embodiments, query application 210 may load contents corresponding link 120, extract a topic vector from the contents, and calculate distances between the topic vector and topic vectors corresponding to hyperlinks stored in database 112. Further, query application 210 may select an additional hyperlink from the hyperlinks based on the distances and identify an additional entity corresponding to the additional hyperlink.

Figure 3:
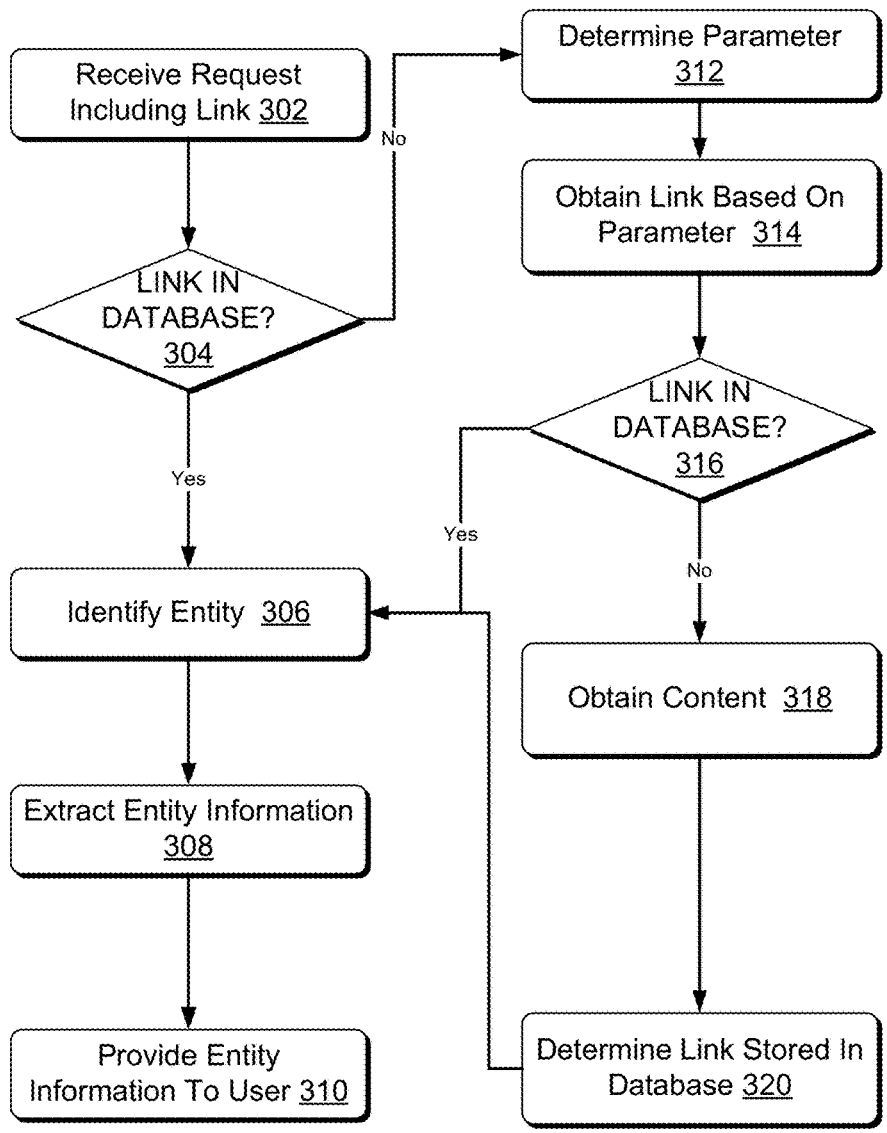
FIG. 3 is a flow diagram of an illustrative process for retrieval of content using link-based searches.

FIG. 3 is a flow diagram of an illustrative process 300 for retrieval of content using link-based searches. Process 300 is illustrated as a collection of blocks in a logical flow graph, which represents a sequence of operations that can be implemented in hardware, software, or a combination thereof. In the context of software, the blocks represent computer-executable instructions that, when executed by one or more processors, cause the one or more processors to perform the recited operations. Computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly. Process 300 is described concerning environment 100. However, process 300 may be implemented in other environments, and/or computing architecture.

At 302, server 108 may receive request 118 including link 120 (e.g., a hyperlink) directed to a source content, which is associated with entity 122. For example, entity 122 is an item, and the representation is a unique ID of the item. In some instances, the entity is a patent document, and the representation is a serial number associated with the patent documents.

At 304, server 108 may determine whether database 112 includes link 120. For example, database 112 may store information of multiple entities each corresponding to one or more hyperlinks. In some embodiments, server 108 may further collect multiple hyperlinks and contents corresponding to the multiple hyperlinks. Server 108 may extract the information from the contents, associate the information with the multiple entities, and store the information in database 112.

In response to a determination that database 112 includes link 120, server 108 may identify entity 122 corresponding to link 120 at 306 (i.e., "Yes" branch of operation 304).

At 308, server 108 may extract information of entity 122 and provide the information to user device 102. For example, the information may include a representation of an entity, a feature of the entity, the corresponding one or more hyperlinks, and an association between the representation and the one or more hyperlinks.

Server 108 may retrieve the representation and the feature of the entity and provide the representation and the feature to user device 102 at 310.

In response to a determination that database 112 does not include link 120, server 108 may analyze the source content to determine one or more parameters at 312 (i.e., "No" branch of operation 304). For example, the one or more parameters are a keyword that is generated based on the source content, and server 108 may enable a search based on the keyword, for example using searching service 124.

At 314, server 108 may further obtain search results and determine a hyperlink from the search results. For example, server 108 may select a predetermined number of returning results and retrieve one or more hyperlinks corresponding to the returning results.

At 316, server 108 may search database 112 to determine whether database 112 includes the one or more hyperlinks. In response to a determination that database 112 includes the one or more hyperlinks, server 108 may identify an entity corresponding the one or more hyperlink at 306 (i.e., "Yes" branch of operation 316).

In response to a determination that database 112 does not include the one or more hyperlinks, server 108 may obtain and analyze the source content to generate vectors using the source content at 318 (i.e., "No" branch of operation 316). For example, server 108 may load the source content corresponding link 120, extract a topic vector from the contents, and calculate distances between the topic vector and topic vectors corresponding to hyperlinks stored in database 112.

At 320, Further, server 108 may select a hyperlink from the hyperlinks based on the distances and identify an entity corresponding to the hyperlink in the database 112. Accordingly, server 108 may provide information of the entity to user device 102. In some embodiments, various algorithm may be used to decide the closest webpage or document and the associate link. Examples of the algorithms include inverted index, citation index, document-term matrix, and page rank. By applying these algorithms, service 108 may determine the link or document which is closest to the link or the document used for the search.

The present disclosure is further described with reference to the following examples. These examples are provided for purposes of illustration only and are not intended to be limiting unless otherwise specified. Thus, the present disclosure should in no way be construed as being limited to the following examples, but rather, should be construed to encompass any and all variations which become evident as a result of the teaching provided herein.

As noted, conventional search engines (such as Google and Microsoft Bing) permit a user to conduct a search and identify web pages of interest by formulating a search query based on keywords and Boolean operators. While effective, this approach is not conducive to finding content related to that contained in a web page because interpreting the content found on a web page and generating sufficiently relevant keywords, followed by constructing and executing multiple search queries, can be time-consuming and inefficient for a user.

One reason for this is that because keywords are generated by the user and the number of keywords (search terms) used are necessarily limited, a significant amount of relevant or potentially relevant information from the original web page or article may be lost. This means that the results of such a search methodology may be inaccurate (in the sense that the new information found is not as relevant as desired), as the keywords used are both limited and may be somewhat less than optimal (as they depend on the user's familiarity with the content and the process of constructing effective search queries).

As a result, users have to perform an iterative process of carefully reviewing the results of a search (which may be multiple web pages), adjusting their queries, performing another search, and if necessary, repeating the process in order to confidently find content related to (or relevant to) that located on a particular web page. This is very inconvenient and prone to user error, as it requires some degree of skill to convert the content of a web page into the "right" or most effective keywords that will lead to the related content the user is seeking.

In contrast, the linked-based search methodology does not require that a user converts the content of a web page into one or more keywords and then execute subsequent queries, and instead more directly finds matches between the full content of a source web page and the content of other web pages. Thus, the link-based search methodology helps a user to obtain content related to that of the desired web page without specifying keywords and formulating a set of search queries.

In operation, embodiments of the system and methods can be considered in two different use cases or scenarios: (1) a search for a specific entity; or (2) a search for a non-specific entity.

Scenario 1: Search for a Specific Entity

Example use case: when someone is looking at a product page on a merchant website, he/she has to spend extra time to construct and execute searches using different keywords to find related information that may be potentially relevant to the consumer. This information might include, for example, coupons, sales, promotional offers, available inventory information from other vendors, product reviews, social media "chatter" regarding a product or manufacturer, etc. However, by using the linked-based search methodology, the consumer can simply activate a bookmark or browser plugin, or copy the link and execute a search. In response, a server would return an aggregated and comprehensive view of the product from multiple sources of related and presumably relevant content. This permits the user to quickly access a larger and more comprehensive set of information about the product, its availability, its pricing, reviews, etc. This saves the user time and enables users who are not as familiar or comfortable with constructing their own search queries to obtain valuable and useful information.

The specific entity use case is one in which an object or subject of interest is identified, such as a product, event, or a celebrity. Taking a product as an example, at present, information about or related to a product is typically separated across multiple web pages that are populated with different types of content by different owners. For example, a pair of the same designer shoes may be sold on-line by multiple merchants and displayed on multiple web pages. However, when a user wants to make a purchase, he/she would be interested in knowing all related information for that particular product in order to make the "best" purchasing decision. This might include pricing options, sales, promotional offers, availability options, product reviews, images, vendor return policies, etc.

Figure 4A:
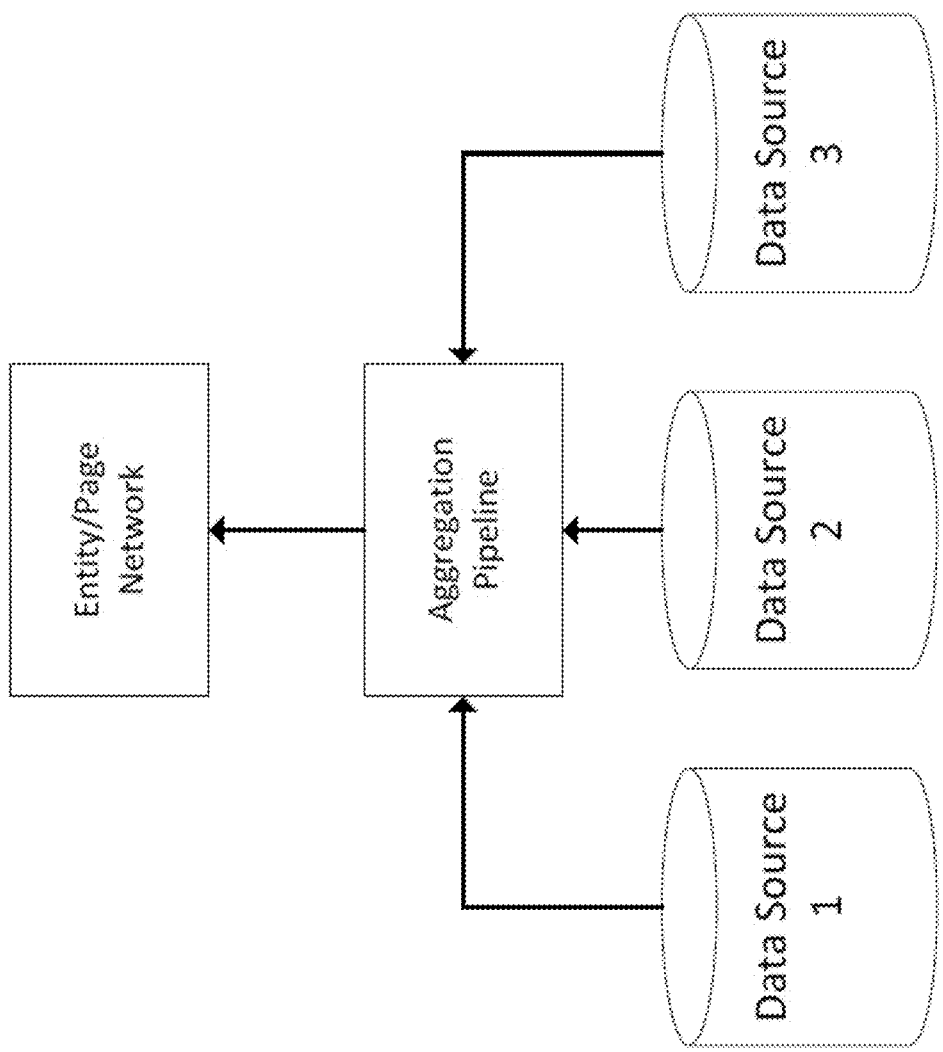
FIGS. 4(a), 4(b), 4(c), and 4(d) are diagrams illustrating aspects of a data processing pipeline (FIG. 4(a)), data relationships (FIG. 4(b)), and process flows (FIGS. 4(c) and 4(d)) that may be used in implementing embodiments of the system and methods.
Figure 4B:
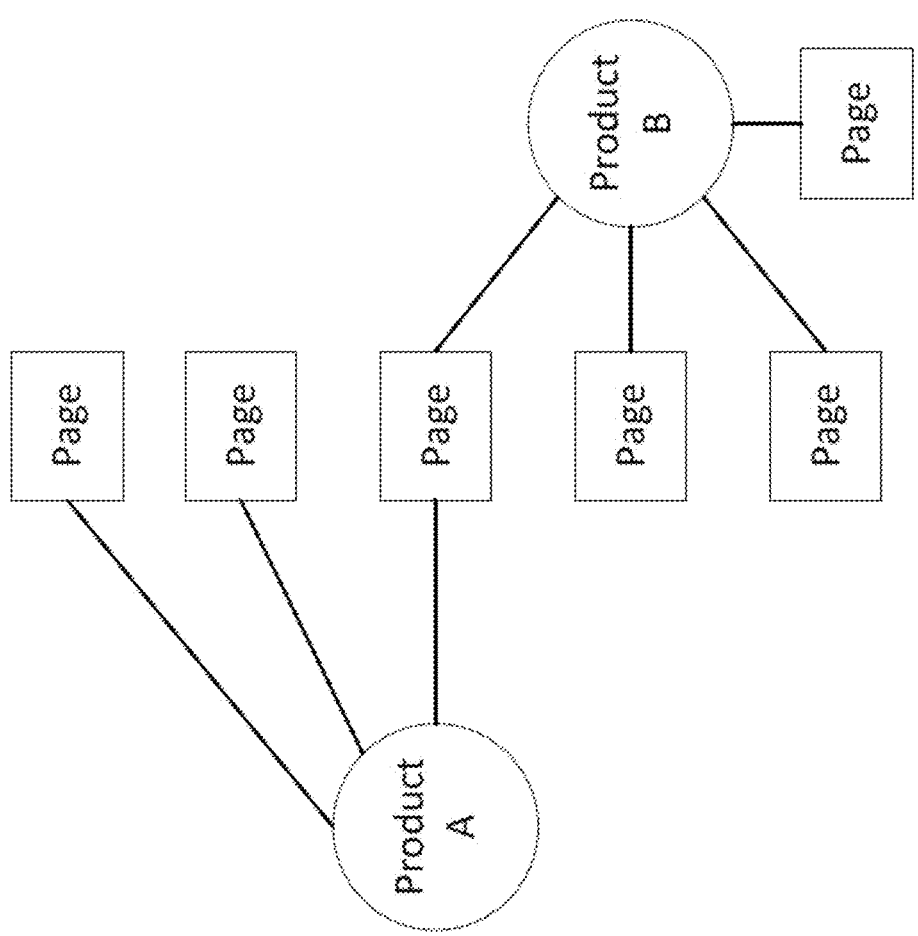
Figure 5:
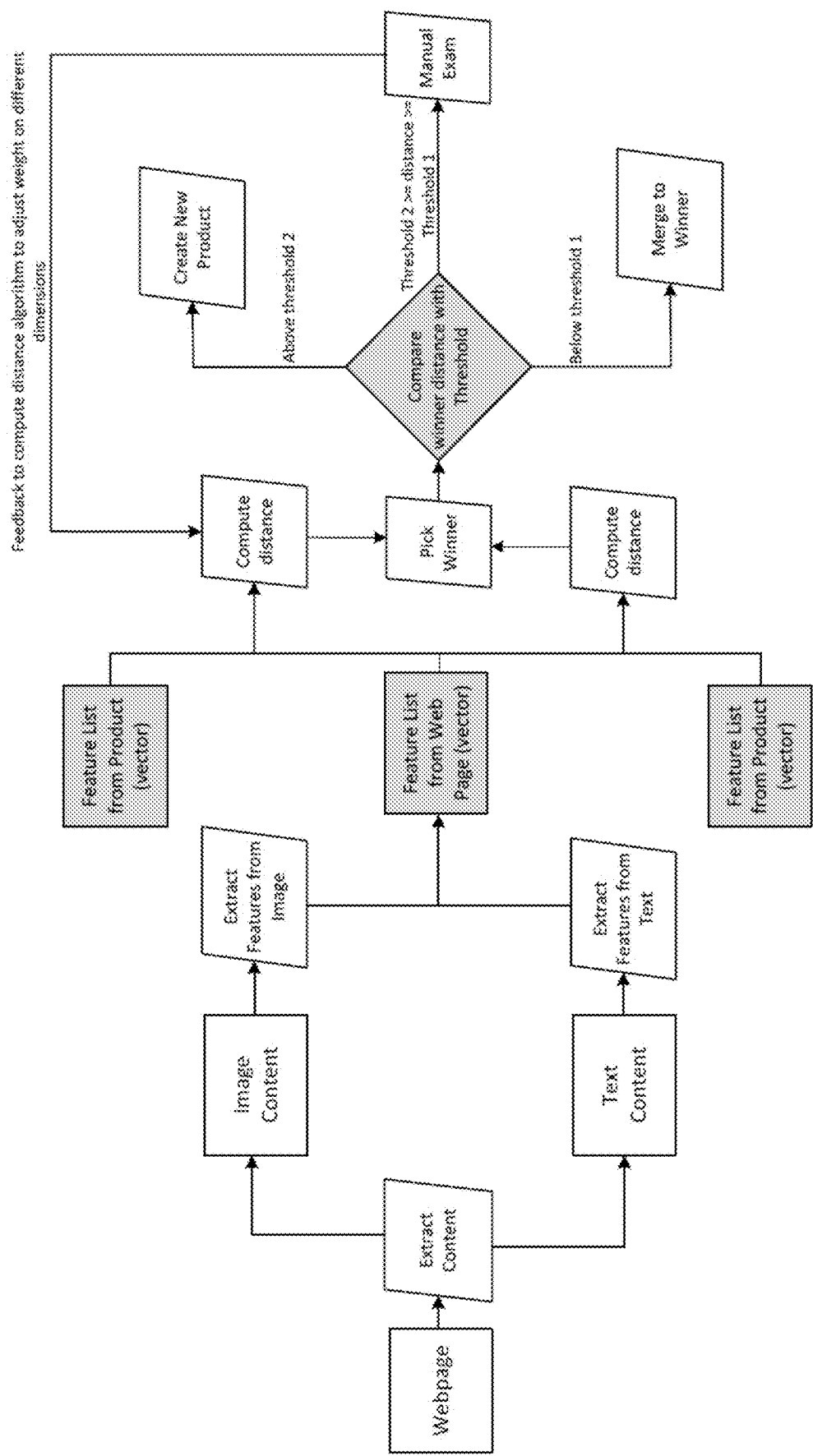
FIG. 5 is a diagram illustrating a data processing pipeline that may be used in implementing embodiments of the system and methods.

In some embodiments, a data acquisition and processing pipeline (as illustrated in FIG. 4(a) and FIG. 5) may be used to access content from different web pages across the same or different websites, and operate to identify relationships and shared entities between the different pages across the same domain or different domains. This permits the system and methods to identify a set of web pages containing information about a particular product (e.g., inventory information for multiple merchants, blog posts about the product, promotional offers, and users' reviews). In some embodiments, the pipeline may implement one or more types of machine learning technologies or methods to identify a possible relationship between pages or between items of content on pages. For example, as explained herein with reference to Scenario I, the features could be extracted from text and pictures of a web page of a product. The system can then compare the features extracted with features of existing products in a database to compute a metric or distance between the two products. The product in the database having the shortest metric/distance to the product from the web page could be treated as the most similar one. If the distance of the most similar one meets a certain threshold, then the web page containing the product could be merged with the most similar one found in the database. This permits the product/entity to be identified from the data sources, along with information about the relationships between the product/entity and the set of pages containing related content. This permits construction of a network indicating the relationships between the product/entity and the various pages of content, as illustrated in FIG. 4(b).

Figure 4C:
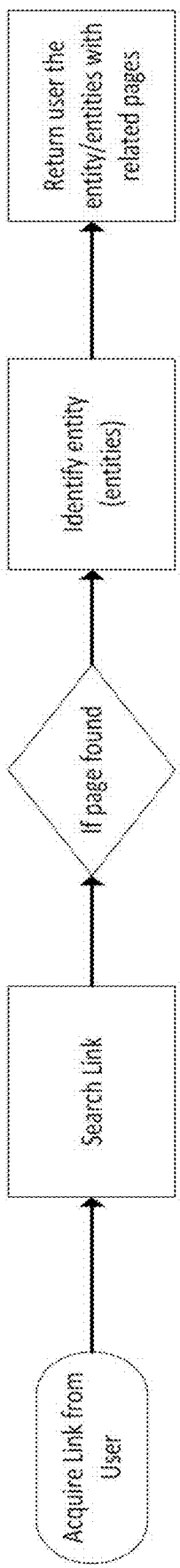

As on the internet, each page may be represented by a link (i.e., a web address). The present disclosure constructs an index or table of links from the set of web pages of interest. When a user provides a link for initiating a search, the present disclosure can identify which page it is and the entity or subject associated with that page. The present disclosure then performs a look-up in the table or index and returns all related pages for that entity to the user, as suggested by FIG. 4(c) (the present disclosure may also (or instead) provide the user with an aggregated set of information from all of the related pages).

Scenario 2: Search for a Non-Specific Entity

Example use case: here, a user is looking at a piece of content (such as a news report) and would like to find other, related news items in order to learn more about the situation or event. Instead of generating keywords from the content of the page to use as a basis for searches performed by a search engine (such as Google or Bing), the user can instead use an embodiment of the present disclosure to "search by link" and more easily (and completely) obtain highly related (and presumably relevant) information from other web pages.

Information about a non-specific entity may be presented on different pages (e.g., different articles covering an issue, as expressed from different perspectives). In this example, the sources present related information, but would not be classified as a single entity, as the perspective of the articles could be different (and different facts or statistics may be presented).

In this embodiment, after acquiring the most relevant web pages, each page can be processed to construct a "topic vector" representation of the page, based on word frequency and uniqueness on the page. This enables the present disclosure to build a higher-dimension space containing vectors representing the pages. When a user issues a link search request, the service will load the page and extract/construct the "topic vector" (and/or perform a search based on the link address to find an existing topic vector for the page). Given the multi-dimensional topic vector, the present disclosure can compute a measure of the similarity or difference between the topic vector for one page and the topic vectors for other pages. The different dimensions may be weighted differently when evaluating the measure. Note that the relationships may be difficult to discover by a human viewer. In some cases, different machine learning methods could be used to train the models used to compute the measure. For example, we can label product features by a human for training purposes and apply to a neural network. The result of a trained neural network could then be used to compute the measure later.

This measure or metric may be expressed as a "distance" between the page's topic vector and the topic vector(s) of one or more other pages; typically, this distance metric is then compared or evaluated by applying a suitable decision/thresholding process, and thereby sufficiently relevant or "related" pages may be identified. Note that further processing may also be applied to a set of such metrics in order to compare them or determine a suitable thresholding value for identifying the most useful or relevant pages. As compared with existing keyword query based searches, the linked-based search allows a user to perform a search using a vector that contains significantly more (and more accurate) information based on the full content of the page. In some embodiments, algorithms other than topic vector may be implemented, and the algorithms may include inverted index, document-term matrix, page rank etc. In some embodiments, a computing device may generate a query based on the topic vector of the link or the document used for searches and apply the query to a search engine provided by a third party (e.g., GOOGLE® OR BING®) to obtain a search result.

Figure 4D:
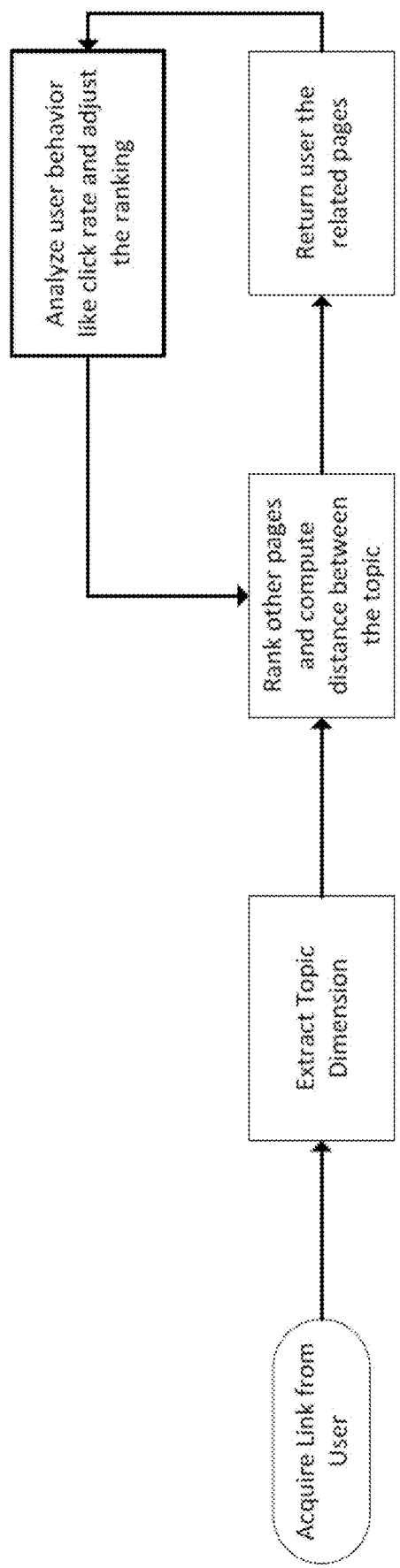

In addition, the present disclosure can analyze the behavior of the user, such as actions indicating a selection of certain content, activation of a link, time (hover) spent on the page, move over time, etc. and provide feedback to a ranking algorithm to provide better results for the "related" pages in future cases. And, based on user feedback, it may be possible to optimize the preferred distance between an input link and pages considered to be related in order to decide which pages (or which content) to present to the user (as suggested by FIG. 4(d)). For example, as described with reference to Scenario 2, a user will click on the link result returned to the user with a preview of the web page. The system can know the pages that users clicked on and how much time they spent on each page. Based on this information, the system may infer which page a user liked most according to the web page searched. The system can use this as a new dimension to training a more user-specific model to compute distance. As an example, some users may prefer very similar content or may like to search for complimentary content. This information can be used to improve the results returned to users when they search by the link. This is possible because of the rich information returned by the web page when searched by link (instead of the query, which is based on a limited set of words or keywords).

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method, comprising:

receiving, by one or more processors of a server, a request from a computing device, wherein the request comprises a hyperlink directed to a source webpage, and wherein the source webpage includes a subject of interest within content of the source webpage, and further wherein the request is for at least one piece of information related to the subject of interest and determined from at least one webpage different from the source webpage, and wherein the at least one webpage different from the source webpage is not a version copy of the source webpage;

determining, by the one or more processors, whether a database associated with the server comprises the hyperlink, wherein the database stores one or more hyperlinks directed to one or more webpages, one or more subjects of interest included within content of each of the one or more webpages, and one or more pieces of information related to each of the one or more subjects of interest;

in response to a determination that the database includes the hyperlink:
identifying, based at least in part on the hyperlink and by the one or more processors, the subject of interest of the source webpage in the one or more subjects of interest stored in the database, and providing, to the computing device and by the one or more processors, the at least one piece of information stored in the database related to the identified subject of interest; and in response to a determination that the database does not include the hyperlink:
- analyzing, by the one or more processors, the source webpage to determine one or more parameters related to the subject of interest included within content of the source webpage,
- based at least in part on the one or more parameters, performing, by the one or more processors, a search for pieces of information related to the subject of interest from one or more webpages different from the source webpage, wherein the one or more webpages different from the source webpage are not version copies of the source webpage, and
- providing, by the one or more processors, a search result to the computing device.

2. The method of claim 1, wherein the one or more pieces of information related to the subject of interest of the source webpage in the one or more subjects of interest stored in the database include:
- a representation of the subject of interest of the source webpage;
- a feature of the subject of interest of the source webpage;
- the one or more hyperlinks; and
- an association between the representation and the one or more hyperlinks.

3. The method of claim 2, wherein providing the at least one piece of information to the computing device includes:
- retrieving the representation and the feature of the subject of interest of the source webpage from the database; and
- providing the representation and the feature to the computing device.

4. The method of claim 2, wherein the subject of interest of the source webpage is an item, and wherein the representation is a unique ID of the item.

5. The method of claim 2, wherein the subject of interest of the source webpage is a patent document, and wherein the representation is a serial number associated with the patent document.

6. The method of claim 1, further comprising:
- collecting a plurality of hyperlinks and content corresponding to the plurality of hyperlinks;
- extracting pieces of information from the content corresponding to the plurality of hyperlinks;
- associating the pieces of information extracted from the content with the one or more subjects of interest stored in the database; and
- storing the pieces of information extracted from the content in the database.

7. The method of claim 1, wherein the one more parameters are one or more keywords, and wherein performing the search based at least in part on the one or more parameters includes:
- performing the search based at least in part on the one or more parameters using a search engine that is provided by a third-party service provider;
- identifying a predetermined number of results returned in response to the search;
- retrieving hyperlinks corresponding to the identified results;
- searching the database to identify at least one subject of interest of the one or more subjects of interest stored in the database that corresponds to at least one of the hyperlinks corresponding to the identified results; and
- generating the search result based on the at least one subject of interest.

8. The method of claim 1, wherein analyzing the source webpage to determine the one or more parameters includes:
- loading the content of the source webpage;
- extracting a topic vector from the content of the source webpage;
- calculating distances between the topic vector and one or more topic vectors corresponding to the one or more hyperlinks stored in the database;
- selecting an additional hyperlink from the one or more hyperlinks based at least in part on the distances; and
- identifying an additional subject of interest corresponding to the additional hyperlink.

9. A system, comprising:
- one or more processors, and
- memory to maintain a plurality of components executable by the one or more processors, the plurality of components comprising a query application configured to:
  - receive a request comprising a hyperlink directed to a source webpage, wherein the source webpage includes a subject of interest within content of the source webpage;
  - determine whether a database associated with the server comprises the hyperlink, wherein the database stores one or more hyperlinks directed to one or more webpages, one or more subjects of interest included within content of each of the one or more webpages, and one or more pieces of information related to each of the one or more subjects of interest;
  - in response to a determination that the database includes the hyperlink:
    - identify, based at least in part on the hyperlink, the subject of interest of the source webpage in the one or more subjects of interest stored in the database,
    - identify at least one piece of information stored in the database related to the subject of interest, and
    - provide the at least one piece of information to a computing device; and
  - in response to a determination that the database does not include the hyperlink:
    - analyze the source webpage to determine one or more parameters related to the subject of interest included within content of the source webpage,
    - based at least in part on the one or more parameters, perform a search for pieces of information related to the subject of interest from one or more sources other than the source containing the source webpage,
    - obtain a search result, and
    - provide the search result to the computing device.

10. The system of claim 9, wherein the one or more pieces of information related to the subject of interest of the source webpage in the one or more subjects of interest stored in the database include:
- a representation of the subject of interest of the source webpage;
- a feature of the subject of interest of the source webpage;
- the one or more hyperlinks; and
- an association between the representation and the one or more hyperlinks.

11. The system of claim 10, wherein providing the at least one piece of information to the computing device includes:

retrieving the representation and the feature of the subject of interest of the source webpage from the database; and providing the representation and the feature to the computing device.

12. The system of claim 10, wherein the subject of interest is an item, and wherein the representation is a unique ID of the item.

13. The system of claim 10, wherein the subject of interest is a patent document, and wherein the representation is a serial number associated with the patent document.

14. The system of claim 9, wherein the query application is further configured to:
collect a plurality of hyperlinks and content corresponding to the plurality of hyperlinks;
extract pieces of information from the content corresponding to the plurality of hyperlinks;
associate the pieces of information extracted from the content with the one or more subjects of interest stored in the database; and
store the pieces of information extracted from the content in the database.

15. The system of claim 9, wherein the one more parameters are one or more keywords, and wherein performing the search based at least in part on the one or more parameters includes:
performing the search based at least in part on the one or more parameters using a search engine that is provided by a third-party service provider;
identifying a predetermined number of results returned in response to the search;
retrieving hyperlinks corresponding to the identified results;
searching the database to identify at least one subject of interest of the one or more subjects of interest stored in the database that corresponds to at least one of the hyperlinks corresponding to the identified results; and
generating the search result based on the at least one subject of interest.

16. The system of claim 9, wherein analyzing the source webpage to determine the one or more parameters includes:
loading the content of the source webpage;
extracting a topic vector from the content of the source webpage;
calculating distances between the topic vector and one or more topic vectors corresponding to the one or more hyperlinks stored in the database;
selecting an additional hyperlink from the one or more hyperlinks based at least in part on the distances; and
identifying an additional subject of interest corresponding to the additional hyperlink.

17. A non-transitory computer-readable storage medium, storing program instructions that when executed by one or more computing devices cause the one or more computing devices to implement:
receiving, from a computing device, a request comprising a hyperlink directed to a source webpage, wherein the source webpage includes a subject of interest within content of the source webpage, and wherein the request is for at least one piece of information related to the subject of interest and determined from at least one webpage different from the source webpage, and further wherein the at least one webpage different from the source webpage is not a version copy of the source webpage;
determining whether a database associated with the server comprises the hyperlink, wherein the database stores one or more hyperlinks directed to one or more webpages, one or more subjects of interest included within content of each of the one or more webpages, and one or more pieces of information related to each of the one or more subject of interest;
in response to a determination that the database includes the hyperlink:
identifying, based at least in part on the hyperlink, the subject of interest of the source webpage in the one or more subjects of interest stored in the database, and
providing, to the computing device, the at least one piece of information stored in the database related to the identified subject of interest; and
in response to a determination that the database does not include the hyperlink:
analyzing the source webpage to determine one or more parameters related to the subject of interest included within content of the source webpage,
based at least in part on the one or more parameters, performing a search for pieces of information related to the subject of interest from one or more webpages different from the source webpage, wherein the one or more webpages different from the source webpage are not version copies of the source webpage, and
providing a search result to the computing device.

18. The non-transitory computer-readable storage medium of claim 17, wherein the one or more pieces of information related to the subject of interest of the source webpage in the one or more subjects of interest stored in the database include:
a representation of the subject of interest of the source webpage;
a feature of the subject of interest of the source webpage;
the one or more hyperlinks; and
an association between the representation and the one or more hyperlinks.

19. The non-transitory computer-readable storage medium of claim 18, wherein providing the at least one piece of information to the computing device includes:
retrieving the representation and the feature of the subject of interest of the source webpage from the database; and
providing the representation and the feature to the computing device.

20. The non-transitory computer-readable storage medium of claim 17, wherein the one or more computing devices further implement:
collecting a plurality of hyperlinks and content corresponding to the plurality of hyperlinks;
extracting pieces of information from the content corresponding to the plurality of hyperlinks;
associating the pieces of information extracted from the content with the one or more subjects of interest stored in the database; and
storing the pieces of information extracted from the content in the database.

* * * * *